United States Patent
Brueckner et al.

(10) Patent No.: US 8,839,426 B1
(45) Date of Patent: Sep. 16, 2014

(54) FIGHT-THROUGH NODES WITH DISPOSABLE VIRTUAL MACHINES AND ROLLBACK OF PERSISTENT STATE

(71) Applicant: Architecture Technology Corporation, Minneapolis, MN (US)

(72) Inventors: Stephen K. Brueckner, Ithaca, NY (US); Robert A. Joyce, Ithaca, NY (US); Carl Manson, Eden Prairie, MN (US); Hajime Inoue, Ithaca, NY (US); Kenneth J. Thurber, Hopkins, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 14/014,242

(22) Filed: Aug. 29, 2013

Related U.S. Application Data

(63) Continuation of application No. 14/011,642, filed on Aug. 27, 2013.

(60) Provisional application No. 61/863,801, filed on Aug. 8, 2013.

(51) Int. Cl.
*H04L 29/06* (2006.01)

(52) U.S. Cl.
CPC .................................. *H04L 63/145* (2013.01)
USPC .............................................. 726/22; 726/23

(58) Field of Classification Search
USPC ................. 726/22–26; 713/187–188
See application file for complete search history.

(56) References Cited

U.S. PATENT DOCUMENTS

| | | | |
|---|---|---|---|
| 7,076,801 B2 | 7/2006 | Gong et al. | |
| 7,134,123 B1 | 11/2006 | Berry et al. | |
| 7,350,234 B2 | 3/2008 | Goseva-Popstojanova et al. | |
| 2009/0007100 A1* | 1/2009 | Field et al. | 718/1 |
| 2012/0042365 A1* | 2/2012 | Shoval et al. | 726/7 |
| 2012/0259816 A1* | 10/2012 | Cargille et al. | 707/649 |
| 2013/0055256 A1* | 2/2013 | Banga et al. | 718/1 |
| 2013/0097603 A1* | 4/2013 | Amano et al. | 718/1 |
| 2013/0166703 A1* | 6/2013 | Hammer et al. | 709/220 |

OTHER PUBLICATIONS

U.S. Appl. No. 14/011,642, entitled "Fight-Through Nodes With Disposable Virtual Machines and Rollback of Persistent State," filed Aug. 27, 2013.
Rutkowska, "Disposable VMs," The Invisible Things Lab's blog, Kernel, Hypervisor, Virtualization, Trusted Computing and other system-level security stuff, Jun. 1, 2010, 7pp.

(Continued)

*Primary Examiner* — Edward Zee
*Assistant Examiner* — Chi Nguy
(74) *Attorney, Agent, or Firm* — Shumaker & Sieffert, P.A.

(57) ABSTRACT

A server system receives messages from client computing devices. Each of the messages corresponds to a transaction. The server system assigns each respective transaction to a respective fresh virtual machine. Furthermore, the server system performs, as part of a respective virtual machine processing a respective transaction, a modification associated with the respective transaction to a shared database. The shared database is persisted independently of the plurality of virtual machines. In response to determining that processing of the respective transaction is complete, the server system discards the respective virtual machine. In response to determining that the respective transaction is associated with a cyber-attack, the server system uses checkpoint data associated with the respective transaction to roll back the modifications associated with the respective transaction to the shared database.

20 Claims, 10 Drawing Sheets

(56) References Cited

OTHER PUBLICATIONS

Borman et al., "A Serially Reusable Java(tm) Virtual Machine Implementation for High Volume, Highly Reliable, Transaction Processing," Accessed Apr. 29, 2013, 21 pp.
Hachman, "Facebook's Web Server Strategy: 'Chinese Foot Soldiers'," PCMag.com, Mar. 15, 2011, 4pp.
Matthews et al., "Data Protection and Rapid Recovery From Attack With a Virtual Private File Server and Virtual Machine Appliances," Clarkson University, 2005, 12 pp.
Reynolds et al., "The Design and Implementation of an Intrusion Tolerant System," IEEE Proceedings of the International Conference on Dependable Systems and Networks (DSN'02), 2002, 6 pp.
Shi et al., "An Intrusion-Tolerant and Self-Recoverable Network Service System Using a Security Enhanced Chip Multiprocessor," IEEE Proceedings of the Second International Conference on Autonomic Computing (ICAC'05), 2005, 11pp.
Reiser et al., "VM-FIT: Supporting Intrusion Tolerance with Virtualisation Technology," Proceedings of the 1st Workshop on Recent Advances in Intrusion-Tolerant Systems, pp. 18-22, 2007.
Wang et al., "SafeFox: a Safe Lightweight Virtual Browsing Environment," Proceedings of the 43rd Hawaii International Conference on System Sciences—2010, 10 pp.
"Install SharePoint 2013 across multiple servers for a three-tier farm," SharePoint 2013, Jul. 16, 2012, 13 pp.
Verissimo, "MAFTIA—Malicious and Accidental Fault Tolerance for Internet Applications," TF-CSIRT Workshop, Sep. 2005, 14 pp.
"Organically Assured and Survivable Information Systems (OASIS) Technology Transition Assessment (OTTA)," AFRL-IF-RS-TR-2004-67, Final Technical Report, Mar. 2004, 56 pp.
"VMware High Availability," Easily Deliver High Availability for All of Your Virtual Machines, VMware, Inc., 2009, 2 pp.
"VMware vSphere™ 4 Fault Tolerance: Architecture and Performance," White paper, VMware, Inc., 2009, 19 pp.

\* cited by examiner

| Transaction and Worker Details | | | | | | |
|---|---|---|---|---|---|---|
| Transaction (ID) ▽△ | Client IP ▽△ | Duration (seconds) ▽△ | Traffic in/out (bytes) ▽△ | Worker (ID) ▼△ | Mem (%) ▽△ | CPU (%) ▽△ |
| 90341231 | 172.24.5.33 | 2.016 | 1024/56 | 4 | 93 | 15 |
| 83472983 | 223.169.4.12 | 1.110 | 16804/1550 | 12 | 35 | 7 |
| 23123412 | 56.104.5.140 | 2.532 | | 23 | 87 | 77 |
| ... | ... | ... | ... | ... | ... | ... |

Select Columns...
Reorder Columns...
Sort by...

Drop connection
Pause worker
Kill worker
Repair worker
Save worker state

Select Columns...
Reorder Columns...
Sort by...

| Time Period ▽ | Transactions (quantity) ▽△ | Traffic In (mb) ▽△ | Traffic Out (mb) ▽△ | Worker Usage (%) ▽△ | Worker Startup time (avg secs) ▽△ | Worker Refresh time (avg secs) ▽△ |
|---|---|---|---|---|---|---|
| Startup Month Week Day Hour Minute | 899433 34435 ... | 123444 9389 ... | 9883431 23234 ... | 25 34 ... | 2.3 1.7 ... | 2.5 2.1 ... |

Global Statistics

FIG. 9

FIGHT-THROUGH NODES WITH DISPOSABLE VIRTUAL MACHINES AND ROLLBACK OF PERSISTENT STATE

This application is a continuation of U.S. patent application Ser. No. 14/011,642, filed Aug. 27, 2013, which claims the benefit of U.S. Provisional Patent Application No. 61/863,801, filed Aug. 8, 2013, the entire content of each of which is incorporated herein by reference.

STATEMENT REGARDING FEDERALLY SPONSORED RESEARCH OR DEVELOPMENT

This invention was made with Government support under Contract FA8750-12-C-0088 with the United States Department of Defense. The Government may have certain rights in this invention.

BACKGROUND

Despite the best security efforts, compromises of information systems continue to occur. While the best practice response to a cyber-attack may be to isolate an attacked network or node, this is often not an acceptable course of action for mission-critical systems. For mission-critical resources, a network or node should be capable of carrying on, even in a degraded state, during a cyber-attack, continuing to provide critical services. Such systems, called "resilient" or "survivable" systems, are able to "fight through" cyber-attacks in order to achieve mission objectives.

Human reaction times are very slow in comparison to the speed of cyber-attacks, which can occur within milliseconds. A survivable system should be able to react to attacks more quickly than can be accomplished through manual intervention. Survivable systems therefore may provide a high degree of automation, so the network or node can dynamically respond to threats in real time.

SUMMARY

In general, the techniques of this disclosure relate to fight-through nodes that may enable network services to continue operation despite compromise due to malicious cyber-attack. Such fight-through nodes may replace or augment nodes, such as servers on enterprise networks, governmental networks, or other types networks. In some examples, fight-through nodes may utilize disposable virtual machines with reduced rollback procedures to provide swift and efficient recovery from compromised states. Fight-through nodes with disposable virtual machines may be referred to as "FTN-Ds."

The techniques may allow for a "survivable network" in which one or more network devices may be able to "fight through" cyber-attacks. This may be of particular value in critical network operations. The "survivable" network may be capable of carrying on, in a perhaps degraded state, during an attack so as to continue to provide critical services. Because human reaction times can be very slow in comparison to the speed of cyber-attacks, the survivable system may be utilized to provide an automated response capability so the network can dynamically respond to threats.

A FTN-D is described herein, which may be a combined hardware/software system that enhances existing networks with survivability properties. The FTN-Ds may replace existing nodes within a network, such as nodes hosting critical services in the network. Example nodes include database servers, information systems, application servers, email servers, FTP servers, web servers or even network infrastructure such as layer three routers or layer two switches, firewalls, intrusion detection system, gateways or the like. A network equipped with one or more FTN-Ds as described herein may be resilient, enabling critical processes to operate despite attacks on nodes or impacts on other parts of the network.

As enterprises rely ever more heavily on their information systems, the frequency and sophistication of cyber-attacks continues to rise. The techniques described herein may improve the survivability of a network's critical server nodes, making it possible to fight through cyber-attacks. Rather than being disabled by such attacks, servers providing critical services may continue to operate in spite of the attack. Entities may use the FTN-Ds described herein to replace critical nodes of their network or information systems. The assurance provided by the FTN-Ds may be applicable to a variety of industries having critical systems (e.g., utilities, health care, financial services, transportation, military, telecom, retail, information technology, etc.).

In some examples, a network device, such as a server computing system, may operate in accordance with the techniques described herein to provide resiliency and survivability. For example, the network device may receive messages from client computing devices. Each of the messages or series of messages may correspond to a different transaction to be processed by a server computing system. When processing the transactions, the server computing system may assign each respective transaction to a respective fresh (i.e., new) virtual machine. The new virtual machine provides a known, clean operating environment for processing the particular transaction. Furthermore, the server computing system may perform, as part of a respective virtual machine processing a respective transaction, a modification associated with the respective transaction to a shared database that stores system state information for the server computing system. The shared database may be persisted independently of the plurality of virtual machines and may provide a mechanism by which state information may persist and may be propagated for use by subsequent transactions for the client computing devices. In response to determining that processing of the respective transaction is complete, the server system may discard the respective virtual machine. In response to determining that the respective transaction is associated with a cyber-attack, the server system may use checkpoint data of the persistent storage to roll back the modifications associated with the respective transaction to the shared database. In this way, in some implementations, only the persistent storage needs to be rolled back. In some examples, checkpoint data and rollback mechanisms for the operating environment for executing the transactions, i.e., the virtual machines, do not need to be utilized.

In one example, this disclosure describes a method comprising initializing, by a computing system, a plurality of virtual machines that execute at one or more computing devices of the computing system. The method also comprises receiving, by the computing system, a plurality of messages from one or more client computing devices, each of the plurality of messages corresponding to a transaction in a plurality of transactions. For each respective transaction in the plurality of transactions, the method comprises assigning, by the computing system, the respective transaction to a respective virtual machine from the plurality of virtual machines. The respective transaction is the first transaction assigned to the respective virtual machine. The method also comprises generating, by the respective virtual machine, as part of the respective virtual machine processing the respective transaction, a database modification request associated with the respective transaction. In addition, the method comprises performing a modification to a shared database in response to the database modification request associated with the respective transaction. The shared database is persisted independently of the plurality of virtual machines. The method also comprises generating checkpoint data associated with the respective transaction. Furthermore, the method comprises, in response to determining that processing of the respective transaction is complete, discarding the respective virtual machine. The method also comprises in response to determining that the respective transaction is associated with a cyber-attack, using the checkpoint data associated with the respective transaction to roll back the modification to the shared database performed in response to the database modification request associated with the respective transaction.

In another example, this disclosure describes a computing system comprising: a shared database and one or more computing devices configured to initialize a plurality of virtual machines that execute at one or more of the computing devices of the computing system. Furthermore, the one or more computing devices are configured to receive a plurality of messages from one or more client computing devices, each of the plurality of messages corresponding to a transaction in a plurality of transactions. For each respective transaction in the plurality of transactions, the one or more computing devices are configured to assign the respective transaction to a respective virtual machine from the plurality of virtual machines. The respective transaction is the first transaction assigned to the respective virtual machine. Furthermore, the one or more computing devices are configured to generate, as part of the respective virtual machine processing the respective transaction, a database modification request associated with the respective transaction. In addition, the one or more computing devices are configured to perform a modification to the shared database in response to the database modification request associated with the respective transaction. The shared database is persisted independently of the plurality of virtual machines. The one or more computing devices are also configured to generate checkpoint data associated with the respective transaction. The one or more computing devices are configured such that, in response to determining that processing of the respective transaction is complete, the one or more processors discard the respective virtual machine. In addition, the one or more computing devices are configured such that, in response to determining that the respective transaction is associated with a cyber-attack, the one or more processors use the checkpoint data associated with the respective transaction to roll back the modification to the shared database performed in response to the database modification request associated with the respective transaction.

In another example, this disclosure describes a computer-readable data storage medium having stored thereon instructions that, when executed, configure a computing system to initialize a plurality of virtual machines that execute at one or more computing devices of the computing system. The instructions also configure the computing system to receive a plurality of messages from one or more client computing devices, each of the plurality of messages corresponding to a transaction in a plurality of transactions. For each respective transaction in the plurality of transactions, the instructions configure the computing system to assign the respective transaction to a respective virtual machine from the plurality of virtual machines, wherein the respective transaction is the first transaction assigned to the respective virtual machine. The instructions also configure the computing system to generate, as part of the respective virtual machine processing the respective transaction, a database modification request associated with the respective transaction. Furthermore, the instructions configure the computing system to perform a modification to a shared database in response to the database modification request associated with the respective transaction. The shared database is persisted independently of the plurality of virtual machines. In addition, the instructions configure the computing system to generate checkpoint data associated with the respective transaction. In response to determining that processing of the respective transaction is complete, the instructions configure the computing system to discard the respective virtual machine. In response to determining that the respective transaction is associated with a cyber-attack, the instructions configure the computing system to use the checkpoint data associated with the respective transaction to roll back the modification to the shared database performed in response to the database modification request associated with the respective transaction.

In another example, this disclosure describes a network node comprising a hardware-based processing system having a set of one or more processing units. The network node also comprises a plurality of virtual machines (VMs) executing on the one or more processing units. In addition, the network node comprises a dispatcher that receives, from one or more client computing devices, a plurality of messages associated with transactions. The dispatcher also assigns each of the transactions to the plurality of virtual machines. In addition, the dispatcher discards each of the VMs when the transactions assigned to the VMs are complete. The network node also comprises one or more intrusion detection systems that detect whether any of the VMs has been compromised and whether a shared database has been compromised. In addition, the network node comprises a checkpointing module that generates checkpoint data based on requests from the VMs to modify the shared database. Furthermore, the network node comprises a rollback module that uses the checkpoint data to roll back modifications to the shared database that are associated with a particular transaction when the one or more intrusion detection systems determine that a VM to which the particular transaction was assigned has been compromised or the shared database has been compromised.

The techniques may provide improved survivability in networks via technologies enhancing likelihood of continuity and transaction completion, allowing network operation to persist under conditions of extreme attack and/or degraded performance. Architectural and operational strategies are described that may ensure survivability, resiliency, and adaptability to "fight through" severe cyber degradation and compromise, and/or to make the adversary's job harder and more costly. The techniques described herein may strengthen cyber readiness in a contested and degraded cyber operational environment, providing a set of automated capabilities to respond dynamically to escalating threats.

The details of one or more embodiments of the invention are set forth in the accompanying drawings and the description below. Other features, objects, and advantages of the invention will be apparent from the description, drawings, and claims.

BRIEF DESCRIPTION OF DRAWINGS

FIG. 8 is a conceptual diagram illustrating an example transaction and worker details table, in accordance with one or more techniques of this disclosure.

FIG. 9 is a conceptual diagram illustrating an example global statistics table, in accordance with one or more techniques of this disclosure.

DETAILED DESCRIPTION

Figure 1:
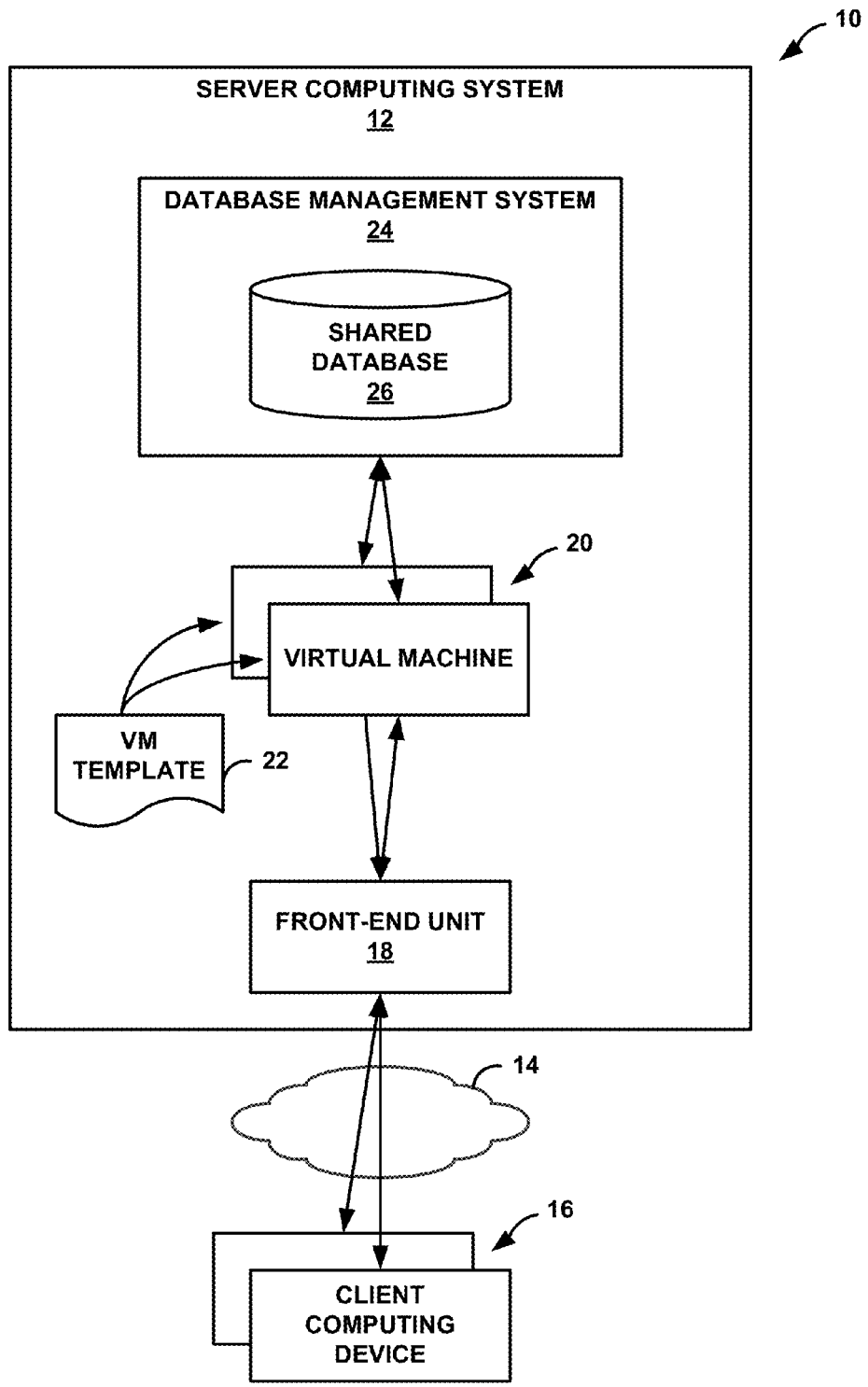
FIG. 1 is a block diagram illustrating an example system that may utilize one or more techniques of this disclosure.

An entity may initiate a cyber-attack in order to cause a computing system to perform actions not desired by an operator of the computing system. For example, an entity may initiate a cyber-attack in order to cause the computing device to provide sensitive data to the entity without permission from the operator of the computing system. In another example, an entity may initiate a cyber-attack in order to cause the computing device to become non-functional.

Many types of cyber-attacks are implemented by causing a low access level process of a server computing system to store malicious software code (e.g., malware) and/or other malicious data. For example, the low access level process may embed malicious software code and/or other malicious data in one or more operating system files, random access memory, or a Basic Input/Output System (BIOS). Although this disclosure refers to software or data associated with cyber-attacks as being "malicious," cyber-attacks may be initiated for lawful purposes. A process with a higher access level (e.g., an operating system) may then execute the malicious software code or otherwise use the malicious data. The subsequent execution of the software code or use of the malicious data by the higher access level process may cause the server computing system to perform actions not desired by an operator of the computing system.

For example, a client computing device may initiate a cyber-attack on a server computing system by sending a request for the server computing system to perform a first transaction. The transaction may be a discrete unit of interaction between the server computing system and a client computing device. In this example, the server computing system may execute the first transaction, which causes the server computing system to store malicious software code in a random access memory (RAM) or a persistent storage device associated with the server computing system. In this example, the malicious software code may persist after execution of the first transaction is complete. Furthermore, in this example, the server computing system may execute a second transaction. The second transaction may or may not be associated with the cyber-attack. During execution of the second transaction, the server computing system may execute or otherwise use the malicious software code, resulting in the server computing system performing actions not desired by the operator of the server computing system, such as divulging secret data.

The techniques of this disclosure may at least partially address one or more of the problems described above. For example, a server computing system may receive messages from client computing devices. The messages may include requests from client computing devices for the server computing system to initiate transactions. In this disclosure, a "transaction" may be a discrete unit of interaction between a server computing system and a remote client computing device. In this example, the server computing system may assign each of the transactions of a different virtual machine (VM). When the server computing system assigns a transaction to a VM, the VM is in a "fresh" state, meaning that the server computing system has not previously assigned a transaction to the VM. Because the VM is in a fresh state, there may be no opportunity for a previous transaction to infect the VM with malicious software code or malicious data. After the transaction is complete, the server computing system may discard the VM. Thus, in this example, the server computing system does not assign another transaction to the VM or otherwise reuse the VM. In this way, each VM instance may process one (or more) transactions for a client and is then deleted. This periodic deletion of VMs may prevent an attacker from gaining a foothold within the server computing system's execution environment.

Furthermore, the server computing system may be associated with a shared database. The shared database may be persistent independent from any of the VMs. When VMs execute transactions, the VMs may request modifications to data in the shared database. Such modifications may include additions to the data in the shared database, modifications of existing data in the shared database, deletions of existing data in the shared database, and so on. In accordance with some examples of this disclosure, the server computing system may generate checkpoints associated with the transactions. If a particular transaction is suspected of being associated with a cyber-attack, the server computing system may use one or more checkpoints associated with the particular transaction to roll back changes to the shared database initiated by execution of the particular transaction. Rolling back changes to the shared database may help to prevent the storage of malicious code or malicious data in the shared database.

FIG. 1 is a block diagram illustrating an example system 10 that may utilize one or more techniques of this disclosure. In the example of FIG. 1, system 10 includes a server computing system 12, a network 14, and a plurality of client computing devices 16. Other examples may include more, fewer, or different components, devices, and/or systems.

Server computing system 12 may provide a Fight-Through Node with Disposable virtual machines (FTN-D). In general, FTN-Ds may be computer systems that are resilient against cyber compromise. In other words, FTN-Ds may be designed to be resilient to attacks and operate reliably despite compromise. As described herein, server computing system 12 may use a pool of ephemeral VMs to isolate and destroy malware (i.e., malicious software and/or data) in applications' primary execution environments. Furthermore, as described herein, persistent data managed by server computing system 12 may be frequently (e.g., periodically) check-pointed so that changes to the persistent data may be rapidly rolled back to previous states if compromise is suspected. That is, the technologies used to achieve resiliency may include sandboxing, disposable virtual machines, parallel processing, rapid checkpointing, and rapid restoration. While survivable against many network attacks (i.e., cyber-attacks), the design of an FTN-D may be particularly effective against more insidious host-based attacks that compromise a server.

Server computing system 12 (i.e., a FTN-D) may replace or augment nodes (e.g., servers) on enterprise networks, military networks, governmental networks, or other types of networks. In some examples, an FTN-D may be an intrusion-tolerant system that is used to replace network nodes (e.g., servers) hosting mission-critical services in a network. Networks equipped with FTN-Ds may be resilient, enabling critical processes to operate despite successful attacks on nodes of the network.

Server computing system 12 may be implemented using one or more computing devices. Each of the one or more computing devices may be a physical device for processing information. Example types of computing devices may include server computing devices, personal computers, mobile computing devices, in-vehicle computing devices, and other types of physical devices for processing information. In some examples, the FTN-D provided by server computing system 12 comprises a software solution that may optionally include dedicated hardware (e.g., one or more physical servers that use VMs to run the same network-available services as an existing server). Furthermore, in some examples, server computing system 12 may comprise commodity hardware located physically and logically inside an entity's (e.g., an enterprise's) network. In other examples, server computing system 12 may provide the FTN-D as a cloud service, using cloud resources instead of local hardware. A cloud-based version of a FTN-D may flexibly scale up or down the number of VMs in a pool of initialized VMs depending on client traffic.

Each of client computing devices 16 may comprise one or more computing devices. For example, client computing devices 16 may include personal computers, mobile computing devices (e.g., laptops, smartphones, tablet computers, etc.), server computing devices, intermediate network devices (e.g., routers, switches, etc.), and/or other types of physical devices for processing information.

Network 14 may facilitate communication between client computing devices 16 and server computing system 12. Network 14 may include various types of communication networks. For example, network 14 may include one or more cellular data networks, one or more wired or wireless local area networks (LANs), one or more wide area networks (WANs), the Internet, and/or another type of communication network.

In the example of FIG. 1, server computing system 12 comprises a front-end unit 18, a plurality of virtual machines (VMs) 20, a VM template 22, and a database management system 24. Front-end unit 18, VMs 20, and database management system 24 may be implemented as software executed by one or more processors of the one or more computing devices of server computing system 12. Furthermore, in some examples, front-end unit 18, VMs 20, and database management system 24 may be implemented as software executed by one or more processors of different computing devices of server computing system 12. Thus, in such examples, front-end unit 18 may be implemented as software executed by one or more processors of a first computing device of server computing system 12, database management system 24 may be implemented as software executed by one or more processors of a second computing device of server computing system 12, and VMs 20 may be implemented as software executed by one or more processors of one or more additional computing devices of server computing system 12.

Front-end unit 18 may comprise one or more front-end components that mediate between external clients (e.g., client computing devices 16) and VMs 20 by forwarding transaction traffic. For example, front-end unit 18 may comprise a listener, a connection handler, a proxy, a dispatcher, an accumulator, a logger, and/or other front-end components.

Front-end unit 18 may receive messages from client computing devices 16 via network 14. The messages may include various types of information. For example, front-end unit 18 may receive, from one of client computing devices 16, a message that implicitly or explicitly includes a request to initiate a transaction. The transaction may be a discrete unit of interaction between server computing system 12 and the client computing device. In one example, the transaction may be a Transmission Control Protocol (TCP) connection (i.e., a TCP session). In this example, front-end unit 18 may receive a TCP SYN message from the client computing device. The TCP SYN message may include a request to initiate a TCP connection. In other examples, the transaction may be a SQL session or another type of session. In examples where a transaction is a session, server computing system 12 may receive multiple messages associated with the session. In other examples, the transaction may comprise a single message, such as a Hypertext Transfer Protocol (HTTP) request. In another example, a transaction may be an application-level message from one of client computing devices 16 followed by a corresponding return message from server computing system 12. Because many network protocols are designed with a transactional model, the approach of this example may be applicable to a wide variety of services.

In examples where transactions are TCP sessions, the techniques of this disclosure may be applicable to any application based on TCP. Furthermore, in such examples, it may not be necessary to customize front-end unit 18 for each application by specifying how applications define transactions. Examples where transactions are TCP sessions may require less overhead to process complex client-server interactions than examples where transactions are application-level messages, and may therefore be performed faster and more securely. In some instances, front-end units (e.g., firewall, handler, dispatcher, etc.) that operate on a TCP session level may be less complex (and hence have a smaller attack surface) than front-end units that operate at an application level.

In response to receiving, from one of client computing devices 16, a message that comprises a request to initiate a transaction, front-end unit 18 may assign the transaction to one of virtual machines 20. In addition, front-end unit 18 may forward the message to the virtual machine assigned to the transaction. In some examples, front-end unit 18 may receive, from the client computing device, additional messages associated with the transaction. In such examples, front-end unit 18 may forward the additional messages to the virtual machine assigned to the transaction. For example, front-end unit 18 may receive a TCP SYN message from a client computing device and may assign the corresponding TCP session to one of VMs 20. In this example, front-end unit 18 may forward the TCP SYN message to the assigned VM and may also forward other TCP messages associated with the TCP session (e.g., TCP ACK messages, TCP FIN messages, etc.) to the assigned VM.

In some examples, front-end unit 18 does not assign a transaction to one of VMs 20 if front-end unit 18 has previously assigned a transaction to the VM. Thus, when front-end unit 18 assigns a transaction to one of VMs 20, the VM may be in a "fresh" state. In other words, a fresh VM is used for each transaction. It may be possible for front-end unit 18 to assign each transaction to a different fresh VM by handling transactions in disposable VMs. In general, a disposable VM may be a VM intended to be used briefly and discarded. Each of VMs 20 may be a disposable VM.

In some examples, because none of VMs 20 has previously processed a transaction, there may be no opportunity for a previous transaction to install malicious code or malicious data on VMs 20, or otherwise reconfigure VMs 20. Thus, using disposable VMs to interact with other computers may prevent stealth malware from persistently infecting server computing system 12 or other computing systems by embedding itself in sensitive data storage areas, such as operating system files of VMs 20, in RAM, a cache, registers, or a BIOS.

In the example of FIG. 1, each of VMs 20 is based on a VM template 22. Thus, each of VMs 20 may have the same initial state. For instance, each of VMs 20 may be based on an image that includes executable software code, an operating system, drivers and all components that provide the operating environment for executing the transactions. In other words, prior to one of VMs 20 being assigned a transaction, the VM may have the same state as each other one of VMs 20 that has not yet been assigned a transaction for execution. VM template 22 may be stored on a persistent or volatile storage medium accessible by server computing system 12. Furthermore, VM template 22 may be determined to be free of malicious code and malicious data. In this way, VMs 20 may all be instantiated from a common template (which can be hardened and known to be clean of infection). In other words, each of the plurality of VMs 20 may be initialized from a common template that has been determined to be free of malware infection.

In some examples, front-end unit 18 may initialize a VM from VM template 22 in response to front-end unit 18 receiving a request to initiate a transaction. In such examples, after initializing the VM, front-end unit 18 may assign the transaction to the newly initialized VM. Thus, initializing a VM may be part of assigning a transaction to the VM. In some examples, front-end unit 18 may initialize a VM in response to front-end unit 18 receiving a request to initiate a TCP session. Thus, in such examples, each new TCP session may cause a new VM to be launched (e.g., initialized).

In other examples, front-end unit 18 may initialize a pool of VMs from VM template 22. The pool of VMs may include a plurality of VMs. In such examples, when front-end unit 18 receives a request to initiate a transaction and assigns the transaction to a VM, front-end unit 18 may select the VM from among the pool of VMs. Thus, front-end unit 18 may assign the transaction to a VM that was initialized prior to front-end unit 18 receiving the request to initiate the transaction. In this way, a new VM may be instantiated for each incoming transaction, either on demand or pre-fetched.

Each of VMs 20 may comprise a software implementation of a machine (i.e., a computing device) that executes programs like a physical machine. Furthermore, VMs 20 may contain one or more applications (e.g., servers) that process client transactions. In some examples, the FTN-D provided by server computing system 12 may run a single application (e.g., a web server) which runs inside each VM instance (e.g., each of VMs 20). In alternative examples, the FTN-D may run multiple applications, either by running multiple applications within the same VM instances (e.g., VMs 20), or by dedicating different VM instances to different applications.

In some examples, one or more of VMs 20 may comprise a system VM (i.e., an operating system-level VM). A system virtual machine may provide a complete system platform that supports execution of a complete operating system, such as Microsoft Windows, Linux, and so on. In some examples where VMs 20 are system virtual machines, VMs 20 may implement hardware virtualization. In other examples, one or more of VMs 20 may be a process VM (i.e., an application-level VM). A process VM may run a single application. Ideally, an application running on a process VM may only use resources and abstractions provided by the process VM.

Furthermore, in some examples, server computing system 12 may use one or more hypervisors to support one or more of VMs 20. A hypervisor may be a piece of software, firmware, and/or hardware that creates and runs VMs. In some examples, the hypervisor is a Type 1 hypervisor. In other examples, the hypervisor is a Type 2 hypervisor. A Type 1 hypervisor runs directly on a host computing device's hardware to control the hardware and to manage one or more guest operating systems (e.g., VMs). A Type 2 hypervisor may run within a conventional operating system environment.

In some examples, server computing system 12 may use a paravirtualization technique to support one or more of VMs 20. Paravirtualization is a virtualization technique that presents a software interface to VMs that is similar but not identical to that of the underlying hardware. Paravirtualization may require some modification to software. Furthermore, in some examples, server computing system 12 may use full virtualization to support one or more of VMs 20. Full virtualization may involve an almost complete simulation of the underlying hardware and may allow software (e.g., an operating system) to run unmodified. Thus, VMs 20 may be a variety of types (e.g., Type 1 hypervisor, Type 2 hypervisor, paravirtualized, fully virtualized, application-level, operating system-level, etc.). In other words, each of the plurality of VMs 20 may be a type I hypervisor, a type II hypervisor, a paravirtualized virtual machine, a fully virtualized virtual machine, an application-level virtual machine, or an operating system-level virtual machine.

In some examples, front-end unit 18 may assign transactions to VMs 20 such that VMs 20 execute the transactions serially in chronological order. That is, front-end unit 18 may wait to assign a transaction to a VM until another VM has finished processing a previous transaction. Assigning transactions to VMs in this way may help to enforce transaction ordering.

Alternatively, front-end unit 18 may assign transactions to VMs 20 such that VMs 20 may execute transactions in parallel. That is, front-end unit 18 may assign transactions to VMs 20 such that two or more of VMs 20 may be concurrently processing different transactions. Assigning transactions to VMs in this way may enable server computing system 12 to service multiple clients simultaneously or to service multiple transactions from a single client simultaneously. Thus, VMs 20 can execute client transactions serially in chronological order or in parallel.

After one of VMs 20 completes a transaction, server computing system 12 may discard the VM. For example, the transaction may be a TCP session that front-end unit 18 has assigned to a particular VM. In this example, server computing system 12 may discard the particular VM after the particular VM outputs a TCP FIN message to a client computing device and has received an ACK message from the client computing device in response to the TCP FIN message. In this way, when the TCP session ends, the particular VM is discarded. For example, a particular message may comprise a request to initiate a TCP session between server computing system 12 and a particular client computing device among client computing devices 16. In this example, server computing system 12 may determine that the particular transaction request is complete when the TCP session terminates. In another example, a transaction may consist of a single request from a client computing device and a single response from server computing system 12 to the request. Thus, in this example, the transaction may start when server computing system 12 receives the request and the transaction may be complete when server computing system 12 sends the response to the request.

When server computing system 12 discards one of VMs 20, server computing system 12 may return the resources of the VM to a pool of available resources and all state information of the VM may be lost. For example, each of VMs 20 may include RAM and a file system on a virtual "hard disk." In this example, a VM may use the file system on the VM's virtual "hard disk" to store application files, a database, and/or other types of data. In this example, data stored in the VM's RAM and virtual "hard disk" may be deleted, overwritten (e.g., with random data or "zero'ed out"), and/or become functionally inaccessible when the VM is discarded.

Because VMs 20 are discarded after VMs 20 complete transactions, any malware installed on VMs 20 while processing the transactions may be discarded along with VMs 20. For example, malware may be installed in one of VMs 20 while the VM is processing a transaction. That is, many types of cyber-attacks attempt to make permanent malicious changes to a machine (e.g., installation of a rootkit or malicious modification of a Windows registry). In this example, the malware is discarded with the VM is discarded. As a result, the malware may not be present when server computing system 12 processes another transaction. Consequently, the immediate harm from the transaction may be relatively small or non-existent. In this way, server computing system 12 may implement a security model based on discarding attacked servers rather than preventing attacks.

In general, each of VMs 20 operates within its own "sandbox." Thus, VMs 20 are unable to modify the state or data of any other one of VMs 20. Moreover, because each of VMs 20 operates within its own sandbox, VMs 20 may only be able to effect server computing system 12 in limited ways, such as by modifying data in shared database 26 or by sending messages for transmission to client computing devices 16. Furthermore, because each of VMs 20 operates within its own sandbox, the effects of a successful cyber-attack on one of VMs 20 may be limited to that VM and do not affect other parts of server computing system 12.

As part of processing transactions initiated by client computing devices 16, VMs 20 may generate messages to send to client computing devices 16. When VMs 20 generate messages to send to client computing devices 16, VMs 20 may send the messages to front-end unit 18. Front-end unit 18 may then forward the messages to appropriate ones of client computing devices 16. In this way, responses resulting from requests from clients (e.g., client computing devices 16) may be sent back from VMs 20 to the clients via front-end unit 18. In some examples, each of VMs 20 and front-end unit 18 have be assigned a different Internet Protocol (IP) address. In such examples, source IP address fields of IP packets sent by front-end unit 18 may specify the IP address of front-end unit 18. Likewise, destination IP addresses of IP packets sent by client computing devices 16 to server computing system 12 may specify the IP address assigned to front-end unit 18. Front-end unit 18 may use other information in the IP packets received by front-end unit 18 to forward the IP packets to particular ones of VMs 20.

In some examples, front-end unit 18 may store transaction responses from VMs 20 until an intrusion detection system has validated the transaction responses as benign. In this example, front-end unit 18 may only send a transaction response back to one of client computing devices 16 after the intrusion detection system has validated that the transaction response is benign. Furthermore, in one example, front-end unit 18 may duplicate requests from a client computing device and may forward the requests to a plurality of VMs. In this example, front-end unit 18 may store the results from each of the multiple VMs and compare the results for consistency before returning one of the results to the client computing device. In this example, each of the plurality of VMs may run different software (i.e., front-end unit 18 may assign the copies of the request to VMs having software diversity) such that each VM may react to a cyber-attack in a different way.

In the example of FIG. 1, shared database 26 comprises a database that is read and/or write accessible by each of VMs 20 (i.e., VMs assigned to process transactions initiated by client computing devices 16). In other words, shared database 26 may be accessible to each of the plurality of VMs 20. In general, shared database 26 may be an organized collection of data. In some examples, shared database 26 may be read and/or write accessible by software, firmware, and/or hardware other than or in addition to VMs 20.

Shared database 26 may store various types of data. For example, shared database 26 may store website data, application state data, session state data, documents, navigation data, scientific data, business data, military data, governmental data, file system data, or various other types of data. Shared database 26 may be implemented in various ways. For example, shared database 26 may comprise a relational database. In another example, shared database 26 may comprise a file system. In a third example, shared database 26 may comprise a block-level storage abstraction. Other applicable types of databases may include NoSQL databases, NewSQL databases, object-oriented databases, RDF databases, XML databases, and so on.

Shared database 26 may be persisted independently of VMs 20. Thus, shared database 26 may continue to exist and be accessible regardless of whether any of VMs 20 exist. For instance, shared database 26 may exist and may be accessible before any of VMs 20 are instantiated and after all of VMs 20 are discarded.

Furthermore, as part of processing transactions initiated by client computing devices 16, VMs 20 may generate database modification requests. The database modification requests may be requests to modify data in shared database 26. In this disclosure, a database modification request may be "associated with" a transaction when a VM generates the database modification request as part of processing the transaction. VMs 20 may generate database modification requests to modify data in shared database 26 because data written to RAM, virtual "hard disks," or other real or virtual data storage media associated with VMs 20 may be deleted (and/or become functionally inaccessible) when VMs 20 are discarded. For instance, the use of disposable VMs may assume a component to hold persistent (shared) state, such as shared database 26. Thus, the example FTN-D design of FIG. 1 may be suitable for many server applications that maintain persistent state on a backend server.

Database management system 24 may receive database modification requests from VMs 20. Furthermore, database management system 24 may perform modifications to shared database 26 in response to the database modification requests. For example, database management system 24 may receive a database modification request associated with a particular transaction. In this example, database management system 24 may perform a modification to shared database 26 in response to the database modification request associated with the respective transaction request.

In some examples, database management system 24 may implement an Application Programming Interface (API). In some such examples, VMs 20 may generate database modification requests when VMs 20 invoke particular methods of the API. Likewise, database management system 24 may receive a database modification request when database management system 24 receives an invocation of a method of the API. Thus, in some examples, the local results of client transactions processed by VMs 20 may be saved via a limited API to a persistent, shared storage component (e.g., a file system) that is integrated with a FTN-D provided by server computing system 12. In some examples, a persistent file system stored at shared database 26 may be configured to only interact with specific ones of VMs 20, and only interact in specific ways using the limited API. For instance, a Network File System (NFS) protocol may be used as an interface between VMs 20 and the persistent shared file system.

The use of shared database 26 (e.g., a shared file system) may provide for continuity of application state between transactions. For example, as part of processing a first transaction, a first VM may generate a database modification request to write a particular piece of data to shared database 26. In this example, as part of processing a second transaction, a second VM may generate a database read request to read the particular piece of data from shared database 26. In another example, server computing system 12 may host a content management system. In this example, server computing system 12 may need to save files or update a database, and if these changes were made locally inside the ephemeral VMs 20, the changes would be deleted when VMs 20 are discarded.

Some applications maintain state between transactions (e.g., either in application memory, on disk, etc.). For example, a web server may have a persistent session with a client (e.g., one of client computing devices 16). The FTN-D provided by server computing system 12 may transfer such internal application state between VM instances via shared database 26 (e.g., a persistent shared file system). In some examples, application state is flushed to the shared file system before a VM is destroyed, and read back in by applications when new VMs are instantiated. Thus, the VM may generate a database modification request as part of completing a transaction. The database modification request may request storage to shared database 26 of an application running on the VM.

In accordance with one or more examples of this disclosure, database management system 24 may implement checkpointing and rollback for shared database 26. Checkpointing is used to record a state history of shared database 26 (e.g., a persistent shared file system). The use of checkpointing may allow shared database 26 to roll back if a compromise is detected on shared database 26. Shared database 26 may be checkpointed at some interval (e.g., after each client transaction or some multiple number of client transactions) to preserve a fine-grained history of the state of shared database 26. In some examples, checkpointing may rely on a file system such as ZFS to create differential snapshots of the file system state. In such examples, the ZFS file system may be used because the ZFS file system natively supports checkpointing and rollback.

In accordance with one or more examples of this disclosure, a transaction may be determined to be associated with a cyber-attack. In some such examples, an intrusion detection system (IDS) operating on server computing system 12 or another computing system may determine that a transaction is associated with a cyber-attack. In other examples, a human may determine that a transaction is associated with a cyber-attack. In general, a transaction may be determined to be associated with a cyber-attack if the transaction constitutes (e.g., comprises) an attempt to cause server computing system 12 or another computing system to perform actions not desired by an operator of server computing system 12 (e.g., an enterprise, governmental unit, etc.).

In response to determining that a transaction is associated with a cyber-attack, database management system 24 may use checkpoint data associated with the transaction to roll back modifications to shared database 26 performed in response to database modification requests associated with the transaction. In some examples, a rollback may be automatically triggered when an unauthorized change to shared database 26 (e.g., a file system) is detected (e.g., using a file system IDS, an application-level IDS, an OS-level IDS, or by manual inspection). In some examples, the rollback may be triggered manually. In one example, shared database 26 may comprise a file system and database management system 24 may check the file system state for correctness. In this example, if the state is incorrect (e.g., because of a transaction associated with a cyber-attack), the state can be rolled back to a previous correct snapshot. In other words, the persistent shared file system can also be restored to an earlier checkpoint. In examples that use checkpointing and a persistent shared state file system, a transaction may be a unit of computation used to form discrete points for disposing of VMs and/or checkpointing a persistent shared state file system.

In many instances, IDSs have high rates of both false negatives (i.e., missed cyber-attacks) and false positives (i.e., false alarms). Furthermore, in many instances, Intrusion Prevention Systems (IPSs) have high rates of both false negatives (i.e., permitting cyber-attacks) and false positives (i.e., denying legitimate activity). An IPS may monitor network and/or system activities for malicious activity, log information about the malicious activity, attempt to block and/or stop the malicious activity, and report the malicious activity. Furthermore, the rate at which humans can identify cyber-attacks is slow. Accordingly, IDSs, IPSs, and human analysis may not be reliable for fighting through cyber-attacks. For at least this reason, the FTN-D provided by server computing system 12, in some examples, does not attempt to prevent cyber-attacks within a transaction (e.g., session). For instance, in some examples, IDSs and IPSs of server computing system 12 do not try to find or block malware while the malware is executing. Rather, server computing system 12 may run each transaction to completion and then discard the VMs on which the transactions ran. For example, if a transaction installed a rootkit on a VM, the rootkit is discarded with the VM. If the transaction modified the persistent application state on shared database 26 in some way, server computing system 12 may discover the incorrect state by application-level checks and may correct the state by rollback. Discrete points in time at which the FTN-D disposes of VMs and creates checkpoints may be determined by discrete units of interaction with remote clients that may be called "transactions." For example, server computing system 12 may generate a checkpoint in response to initiation or termination of a TCP session.

In some examples, the FTN-D provided by server computing system 12 is scaled back in order to provide reduced functionality with better performance. This disclosure may refer to such scaled back versions as "lightweight" FTN-Ds. For example, applications providing a read-only service might not need a persistent shared storage component (e.g., shared database 26). Accordingly, the persistent shared storage component, along with the checkpointing processes, the rollback processes, and any IDS or validation component, may be eliminated. In cases where database management system 24 and associated processes are eliminated, the remaining FTN-D components may integrate instead with a third-party persistent storage system, or a third-party processing system.

One example principle behind the FTN-Ds of this disclosure is similar to the concept of fault tolerance. However, faults may be independent failures, such as hardware malfunctions, and may occur without malicious intent. The response to faults may simply be to repair or replace failed components, with little likelihood of a repeated fault in the near term. Fault-tolerant systems typically use approaches such as replication and redundancy. In contrast to fault tolerant systems, FTN-Ds may be intrusion tolerant systems, a general property of which is that a successful attack on one part of a system should not affect its overall security. Intrusion tolerance may be related to fault tolerance but may be more difficult to address because intrusions may exploit systemic design vulnerabilities, and may occur with malicious intent. Fault tolerant techniques such as component replication may not protect against intrusions, because all components are susceptible to the same attack, and attacks can be repeated frequently. In fact, fault tolerant and intrusion tolerant approaches may not necessarily complement each other. For example, the common fault tolerant approach of replication may generally increase attack surface and the likelihood of compromise. Intrusion tolerance (or attack tolerance) is a type of survivability or resiliency strategy. Some existing resiliency strategies focus on mitigating denial of service (DoS) attacks at the network level to maintain service availability. In contrast to techniques that mitigate only denial of service attacks, the FTN-Ds of this disclosure may focus on mitigating host compromises, which may include a range of attacks on confidentiality, integrity, and availability. Because of this focus, FTN-Ds may be effective against more subtle security threats, such as advanced persistent threats and stealth malware. As described herein, FTN-Ds may run applications inside of VMs to isolate compromises from the host hardware and OS. Common terminology for running one or more clients inside a VM is "virtual appliance" or "browser appliance."

Figure 2:
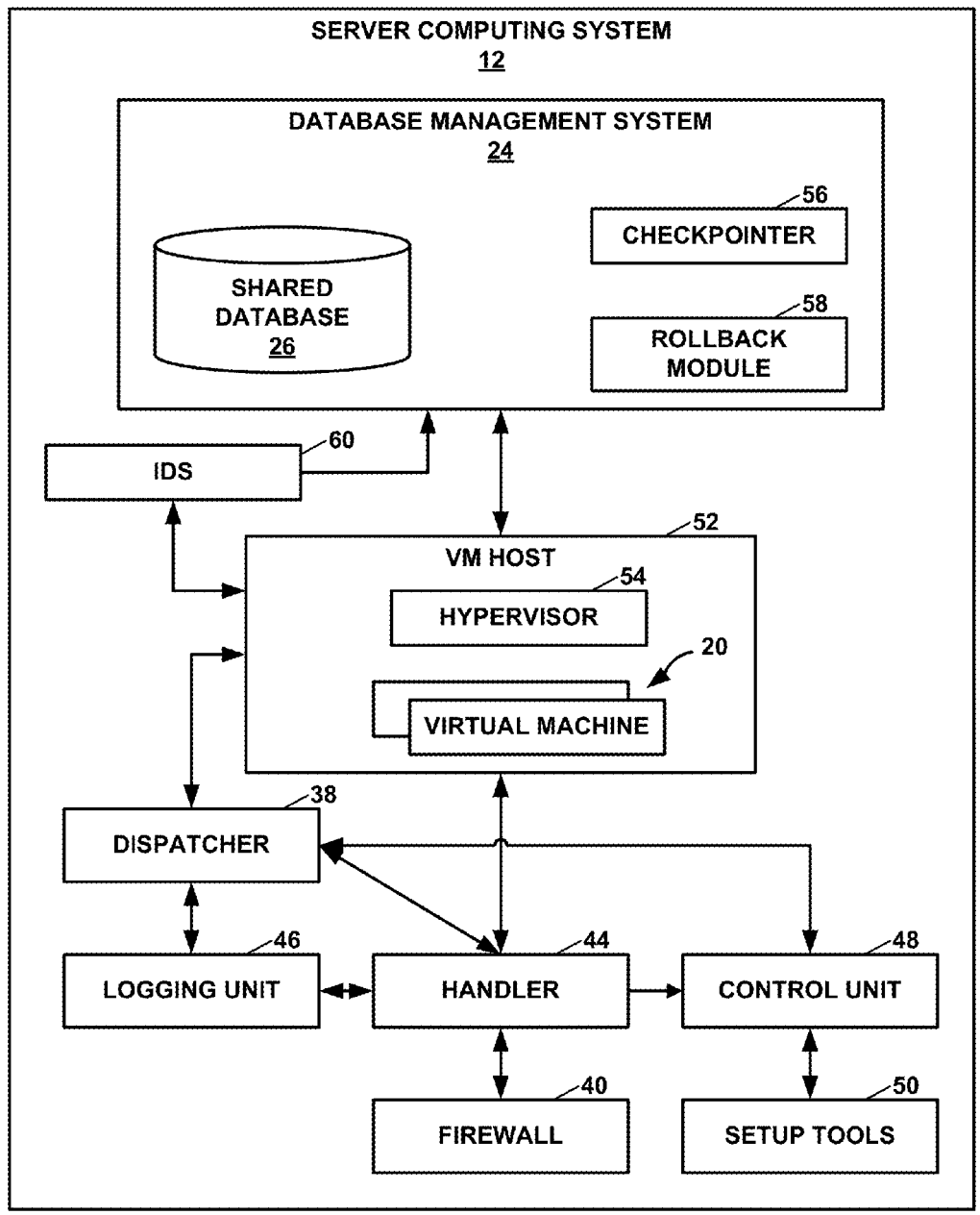
FIG. 2 is a block diagram illustrating an example server computing system, in accordance with one or more techniques of this disclosure.

FIG. 2 is a block diagram illustrating an example server computing system 12, in accordance with one or more techniques of this disclosure. In the example of FIG. 2, server computing system 12 comprises a dispatcher 38, database management system 24, a firewall 40, a handler 44, a logging unit 46, a control unit 48, setup tools 50, and a VM host 52. In some examples, front-end unit 18 (FIG. 1) includes dispatcher 38, firewall 40, handler 44, control unit 48, and setup tools 50. In other examples, server computing system 12 may include more, fewer, or different components.

Firewall 40 may receive data from a network (e.g., network 14). Firewall 40 forwards data that satisfy particular criteria (e.g., data specifying particular port numbers, data specifying particular protocol identifiers, etc.). Firewall 40 does not forward received data that do not satisfy the particular criteria. Handler 44 may receive specific types of data forwarded by firewall 40. For example, handler 44 may receive TCP data forwarded by firewall 40. In another example, handler 44 may receive HTTP data forwarded by firewall 40. When handler 44 receives a data, handler 44 may provide the same or different data to logging unit 46. Logging unit 46 may process and/or store data in order to log data received by handler 44. In addition, handler 44 may forward messages (e.g., TCP messages) to dispatcher 38.

In the example of FIG. 2, VM host 52 comprises a hypervisor 54 and VMs 20. Hypervisor 54 may create and run VMs 20. Hypervisor 54 may be a Type 1 or a Type 2 hypervisor. In other examples, VM host 52 may comprise multiple hypervisors and VMs 20 may run on different ones of the hypervisors of VM host 52. Each of VMs 20 may be a disposable VM in that each of VMs 20 may be discarded after a transaction assigned to the VM is complete.

Dispatcher 38 may identify transactions associated with the messages received from handler 44. In addition, dispatcher 38 may interact with VM host 52 to assign transactions to VMs 20. In some examples, dispatcher 38 may send requests to hypervisor 54 to instantiate a new VM. In other examples, dispatcher 38 may select a VM from a pool of fresh VMs previously instantiated by hypervisor 54. Furthermore, when dispatcher 38 assigns a transaction to a VM, dispatcher 38 may instruct handler 44 to forward messages associated with the transaction to the VM assigned to the transaction. Logging unit 46 may log data provided by dispatcher 38 (and/or data based on data provided by dispatcher 38).

Control unit 48 may provide a user interface for configuration and control of server computing system 12. In some examples, the user interface is a local or remote graphical user interface (GUI), a command line interface, or another type of interface. Logging unit 46 may log data provided by control unit 48 (and/or data based on data provided by control unit 48). Setup tools 50 may comprise tools for configuring server computing system 12. For example, setup tools 50 may include an FTN-D installer application, a VM deployment tool, and so on. In this example, the VM deployment tool may include tools for service and appliance configuration, tools for operating system configuration, tools for platform configuration, and/or other types of tools.

In the example of FIG. 2, database management system 24 comprises shared database 26, a checkpointer 56, and a rollback module 58. In some examples, when database management system 24 receives a database modification request from one of VMs 20, database management system 24 may apply changes indicated by the database modification request to shared database 26. Furthermore, when database management system 24 receives a database modification request from one of VMs 20, checkpointer 56 may generate checkpoint data. Rollback module 58 may use the checkpoint data to roll back changes to shared database 26.

Furthermore, in the example of FIG. 2, server computing system 12 includes an IDS 60. IDS 60 may analyze data to determine whether a transaction is associated with a cyber-attack. For example, IDS 60 may analyze configuration states of VMs 20 to determine whether a transaction has caused a VM to enter a state that is known to be associated with a cyber-attack. In some examples, IDS 60 may analyze requests from VMs 20 to read and/or modify shared database 26. Furthermore, in some examples, IDS 60 may analyze messages generated by VMs 20 for output by server computing system 12 to client computing devices (e.g., client computing devices 16). In some examples, IDS 60 may analyze the state of shared database 26 to determine whether one or more transactions are associated with one or more cyber-attacks or whether shared database 26 is in a compromised state. In some examples, when IDS 60 determines that a transaction is associated with a cyber-attack, IDS 60 may instruct rollback module 58 to roll back changes to shared database 26 associated with the transaction.

Thus, in the example of FIG. 2, server computing system 12 may be a network node comprising a hardware-based processing system having a set of one or more processing units, a plurality of VMs executing on the one or more processing units, a dispatcher that receives, from one or more client computing devices, a plurality of messages associated with transactions, assigns each of the transactions to the plurality of virtual machines, and discards each of the VMs when the transactions assigned to the VMs are complete. Furthermore, server computing system 12 may comprise one or more intrusion detection systems that detect whether any of the VMs or the shared database has been compromised. In addition, server computing system 12 may comprise a checkpointing module that generates checkpoint data based on requests from the VMs to modify a shared database. Server computing system 12 may also comprise a rollback module that uses the checkpoint data to roll back modifications to the shared database that are associated with a particular transaction when the one or more intrusion detection systems determine that a VM to which the particular transaction was assigned has been compromised, or that the shared database has been compromised.

Figure 3:
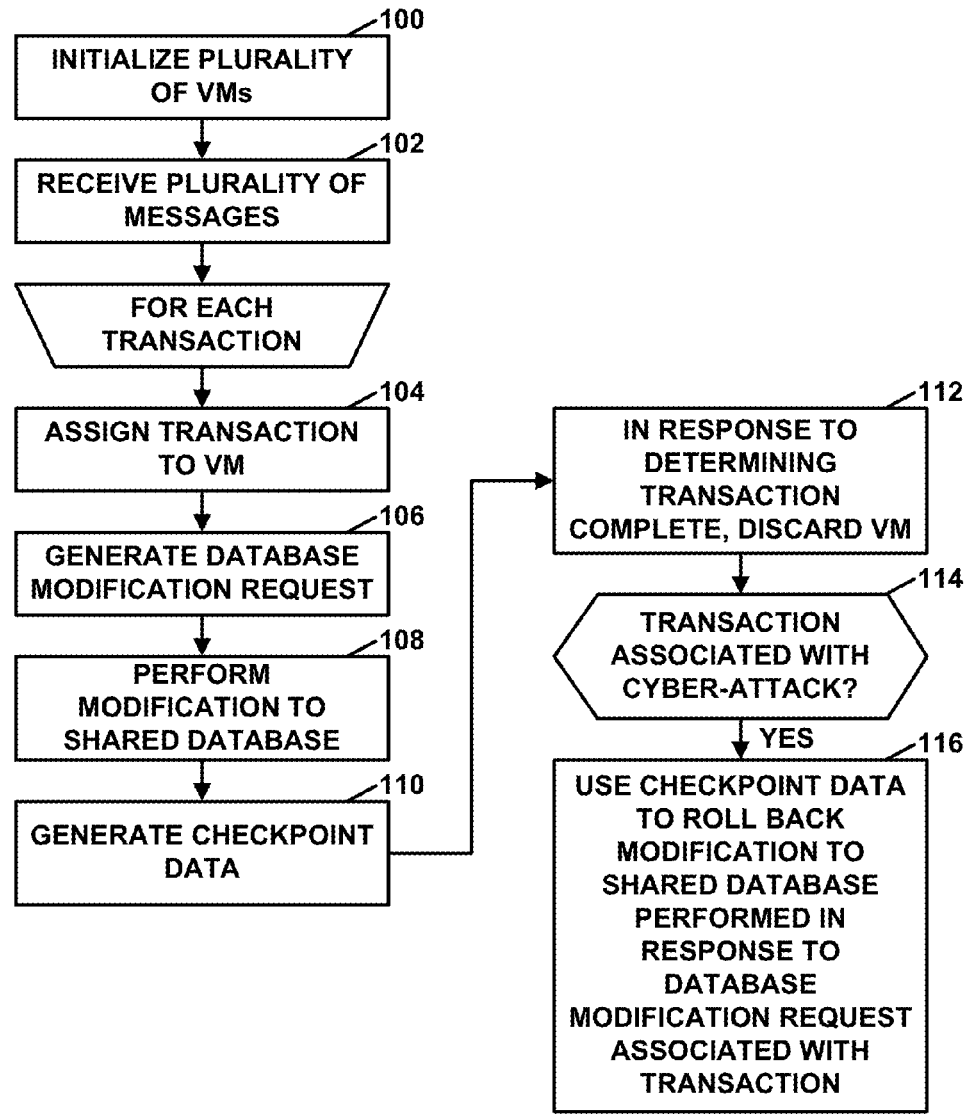
FIG. 3 is a flowchart illustrating an example operation of a server computing system, in accordance with one or more techniques of this disclosure.

FIG. 3 is a flowchart illustrating an example operation of server computing system 12, in accordance with one or more techniques of this disclosure. In the example of FIG. 3, server computing system 12 may initialize a plurality of virtual machines that execute at one or more computing devices of server computing system 12 (100). In addition, server computing system 12 may receive a plurality of messages from one or more client computing devices (102). Each of the plurality of messages may correspond to a transaction in a plurality of transactions. Although the example of FIG. 3 shows server computing system 12 as initializing the plurality of VMs prior to receiving the plurality of messages, in other examples, server computing system 12 may initialize each VM in the plurality of VMs in response to receiving a message that corresponds to a new transaction.

Server computing system 12 may perform the following actions of FIG. 3 for each respective transaction in the plurality of transactions. Particularly, server computing system 12 may assign the respective transaction to a respective VM from the plurality of VMs (104). The respective transaction may be the first transaction assigned to the respective virtual machine. Furthermore, the respective VM may generate, as part of the respective VM processing the respective transaction, a database modification request associated with the respective transaction (106). Server computing system 12 (e.g., database management system 24) may perform a modification to a shared database (e.g., shared database 26) in response to the database modification request associated with the respective transaction (108). In this way, the respective VM may record operational state data to shared database 26 resultant from the processing of the transaction. The shared database is persisted independently of the plurality of VMs. Furthermore, server computing system 12 may generate checkpoint data associated with the respective transaction (110). In some examples, server computing system 12 may generate the checkpoint data associated with the respective transaction in response to the database modification request associated with the respective transaction. In other examples, server computing system 12 may generate the checkpoint data associated with the respective transaction in response to determining that a number of database modification requests associated with the respective transaction exceeds a threshold (e.g., 2, 3, 4, etc.).

In response to determining that processing of the respective transaction is complete, server computing system 12 may discard the respective virtual machine (112). In some examples, server computing system 12 may generate the database modification request as part of completing the transaction. Furthermore, in some examples, the database modification request may request storage to shared database 26 of an application state of an application running on the respective virtual machine. In such examples, server computing system 12 may initialize a particular virtual machine such that an instance of the application running on the particular virtual machine has the application state. In some such examples, the application is a server (e.g., web server, an FTP server, an email server, etc.) that provides a network service.

In addition, server computing system 12 may determine whether the respective transaction is associated with a cyber-attack (114). In other examples, a human or another computing system may determine that the respective transaction is associated with a cyber-attack. Furthermore, in some examples, server computing system 12 may determine that the respective transaction is associated with a cyber-attack in response to determining that the respective transaction attempted to perform an unauthorized modification of programming code of the VM or an unauthorized modification of a configuration of the VM. In another example, server computing system 12 may determine that the respective transaction is associated with a cyber-attack in response to determining that the respective transaction is associated with an unauthorized request to access or modify data in shared database 26. In response to determining that the respective transaction is associated with a cyber-attack (YES of 114), server computing system 12 may use the checkpoint data associated with the respective transaction to roll back the modification to shared database 26 performed in response to the database modification request associated with the respective transaction (116).

Figure 4:
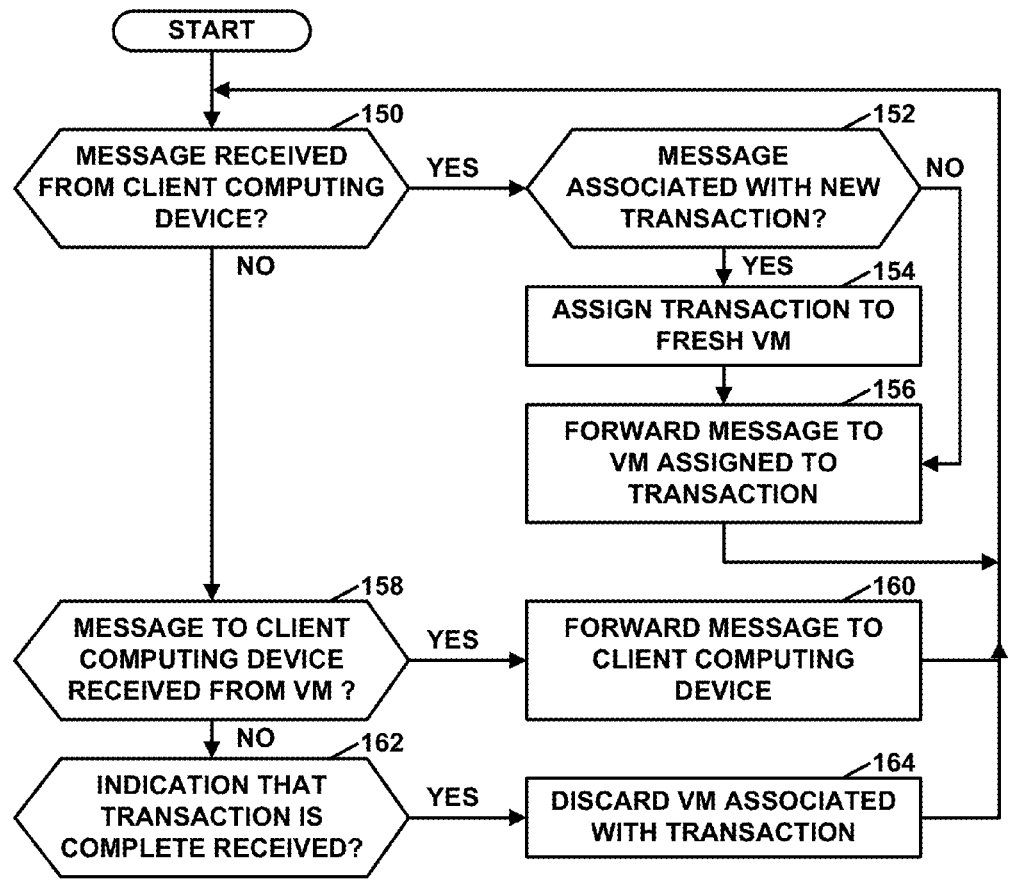
FIG. 4 is a flowchart illustrating an example operation of a front-end unit, in accordance with one or more techniques of this disclosure.

FIG. 4 is a flowchart illustrating an example operation of front-end unit 18, in accordance with one or more techniques of this disclosure. In the example of FIG. 4, front-end unit 18 may determine whether a message has been received from a client computing device (e.g., one of client computing devices 16) (150). In response to determining that a message has been received from a client computing device ("YES" of 150), front-end unit 18 may determine whether the message is associated with a new transaction (152). In response to determining that the message is associated with a new transaction ("YES" of 152), front-end unit 18 may assign the transaction to a fresh VM (154). In some examples, front-end unit 18 may instantiate (e.g., initialize) the VM as part of assigning the transaction to the VM. In other examples, front-end unit 18 may select the VM from a pool of previously initialized fresh VMs as part of assigning the transaction to the VM. After assigning the transaction to the VM or in response to determining that the message is not associated with a new transaction ("NO" of 152), front-end unit 18 may forward the message to the VM assigned to the transaction associated with the message (156).

Otherwise, front-end unit 18 may determine whether a message to a client computing device has been received from a VM (158). In response to determining that a message to a client computing device has been received from a VM ("YES" of 158), front-end unit 18 may forward the message to the client computing device (160).

Furthermore, front-end unit 18 may determine whether an indication that a transaction is complete has been received (162). In response to determining that front-end unit 18 has received an indication that a transaction is complete ("YES" of 162), front-end unit 18 may discard a VM associated with the transaction (164).

Figure 5:
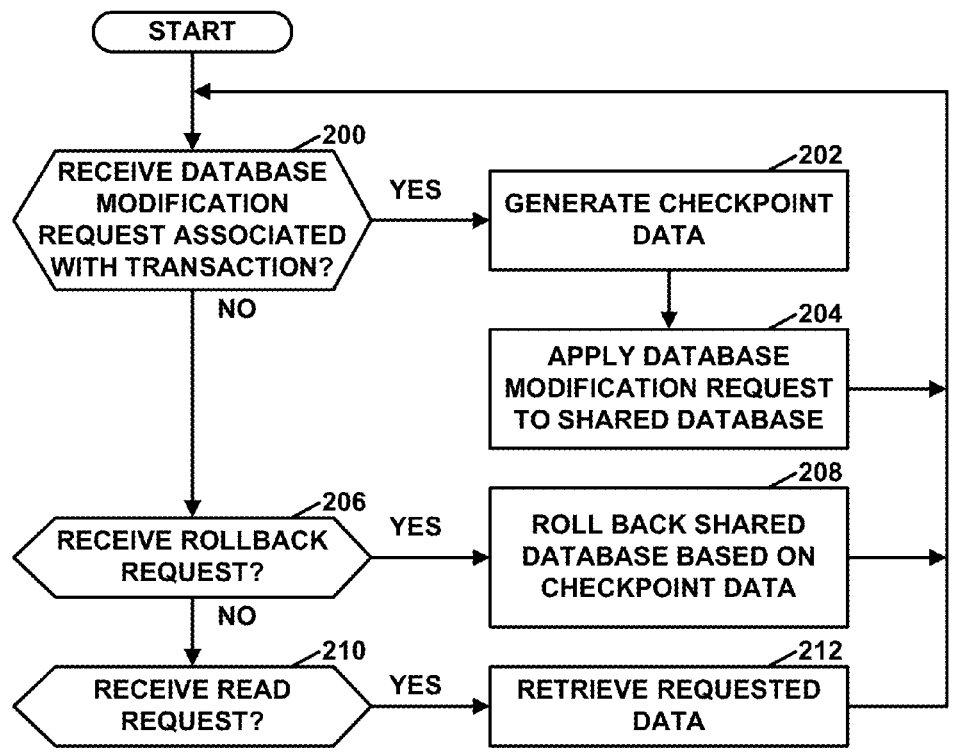
FIG. 5 is a flowchart illustrating an example operation of a database management system, in accordance with one or more techniques of this disclosure.

FIG. 5 is a flowchart illustrating an example operation of database management system 24, in accordance with one or more techniques of this disclosure. In the example of FIG. 5, database management system 24 may determine whether database management system 24 has received a database modification request associated with a transaction (200). In response to determining that database management system 24 has received a database modification request associated with a transaction ("YES" of 200), database management system 24 may generate checkpoint data associated with the transaction (202). In addition, database management system 24 may apply the database modification request to shared database 26 (204).

Otherwise, database management system 24 may determine whether database management system 24 has received a rollback request (206). Database management system 24 may receive a rollback request when a transaction has been determined to be associated with a cyber-attack. In response to receiving a rollback request ("YES" of 206), database management system 24 may roll back shared database 26 based on the checkpoint data (208).

Furthermore, database management database 24 may determine whether database management system 24 has received a read request (210). In response to determining that database management system 24 has received a read request ("YES" of 210), database management system 24 may retrieve, from shared database 26, data requested by the read request (212).

Figure 6:
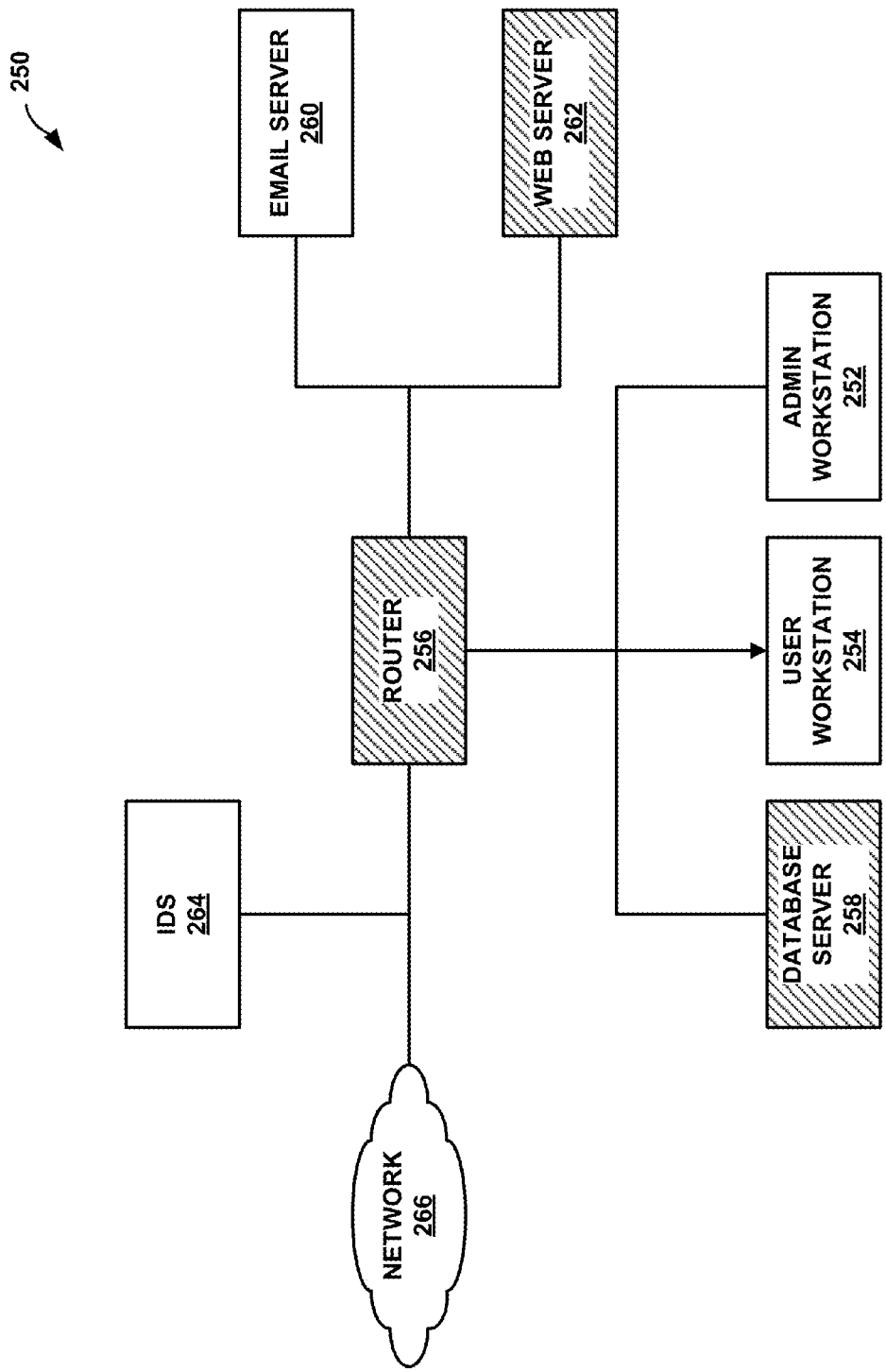
FIG. 6 is a conceptual diagram illustrating an example network that includes fight-through nodes, in accordance with one or more techniques of this disclosure.

FIG. 6 is a conceptual diagram illustrating an example network that includes fight-through nodes, in accordance with one or more techniques of this disclosure. In the example of FIG. 6, each box represents a node of a network 250 and lines indicate physical and/or wireless communication channels between nodes. Network 250 may be an enterprise network, a data center network, or another type of network. In the example of FIG. 6, the nodes of network 250 include an administrator workstation 252, a user workstation 254, a router 256, a database server 258, an email server 260, a web server 262, an IDS 264, and may include other nodes. Router 256 and IDS 264 may receive data from a network 266 (e.g., the Internet). Moreover, router 256 may send data on network 266. Furthermore, in the example of FIG. 6, router 256, database server 258, and web server 262 may be FTN-Ds. In other examples, other nodes of network 250 or other networks may be FTN-Ds. Although the techniques of this disclosure have been described herein as being performed on a "server computing system," the techniques of this disclosure are not so limited. Rather, other types of computing systems may be (or may provide) FTN-Ds.

Figure 7:
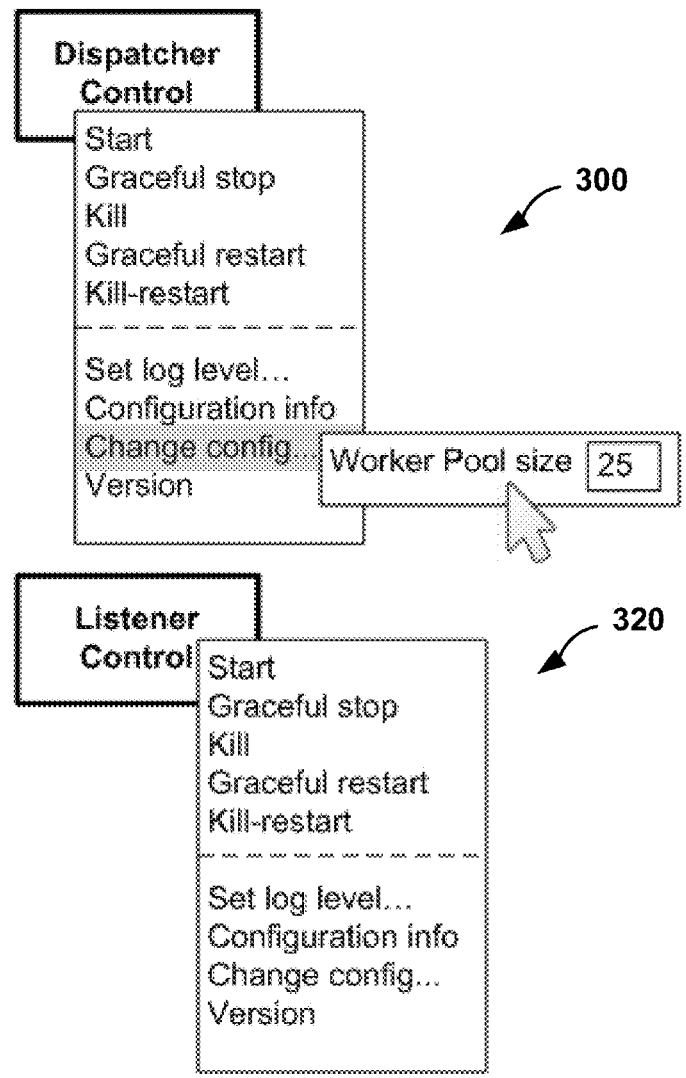
FIG. 7 is a conceptual diagram illustrating an example dispatcher control interface and an example listener control interface, in accordance with one or more techniques of this disclosure.

FIG. 7 is a conceptual diagram illustrating an example dispatcher control interface 300 and an example listener control interface 320, in accordance with one or more techniques of this disclosure. Dispatcher control interface 300 may enable a user to interact with dispatcher 38 (FIG. 2). Listener control interface 320 may enable a user to interact with a listener (e.g., handler 44 of FIG. 2).

In the example of FIG. 7, dispatcher control interface 300 includes menu items "Start," "Graceful stop," "Kill," "Graceful restart," "Kill-restart," "Set log level . . . ," "Configuration info," "Change config . . . ," and "Version." The menu items "Start," "Graceful stop," "Kill," "Graceful restart," and "Kill-restart" may enable a user to start, stop, and/or restart dispatcher 38. The menu item "Set log level . . . " may enable the user to set a level with which dispatcher 38 logs information. The menu items "Configuration info" and "Version" may enable the user to view various configuration and version information about dispatcher 38. The menu item "Change config . . . " may enable the user to change various aspects of dispatcher 38. For instance, in the example of FIG. 7, a field that enables the user to change the worker pool size (i.e., the number of VMs to which dispatcher 38 assigns transactions) may be displayed when the user selects the menu item "Change config . . . . "

Furthermore, in the example of FIG. 7, listener control interface 320 includes menu items similar to those of dispatcher control interface 300. However, in the example of FIG. 7, selection of the menu item "Change config" in listener control interface 320 does not cause a computing device to display a field that enables the user to change the worker pool size.

FIG. 8 is a conceptual diagram illustrating an example transaction and worker details table 340, in accordance with one or more techniques of this disclosure. In the example of FIG. 8, table 340 displays a current state of server computing system 12. Particularly, table 340 includes a separate row for each separate transaction. Furthermore, table 340 includes a transaction ID field, a client IP field, a duration field, a traffic in/out field, a worker id field, a memory percentage field, and a central processing unit (CPU) percentage field for each of the transactions. Table 340 may be sorted based on each of the columns. Furthermore, in some examples, each column of table 340 may be repositionable.

In the example of FIG. 8, a computing device may output, for display, a contextual menu 342 when the computing device receives an indication of user input to select an entry in table 340. Contextual menu 342 may include menu items that enable the user to manage a transaction and/or a worker (i.e., a VM instance) assigned to the transaction.

FIG. 9 is a conceptual diagram illustrating an example global statistics table 360, in accordance with one or more techniques of this disclosure. Global statistics table 360 displays information about the performance and activity of server computing system 12. In the example of FIG. 9, global statistics table 360 includes a quantity of transactions field, a traffic in field, a traffic out field, a worker usage percentage field, a worker startup time field, a worker refresh time field. The fields of global statistics table 360 may be computed for various time periods, such as since startup or for the current month, week, day, hour, or minute.

Figure 10:
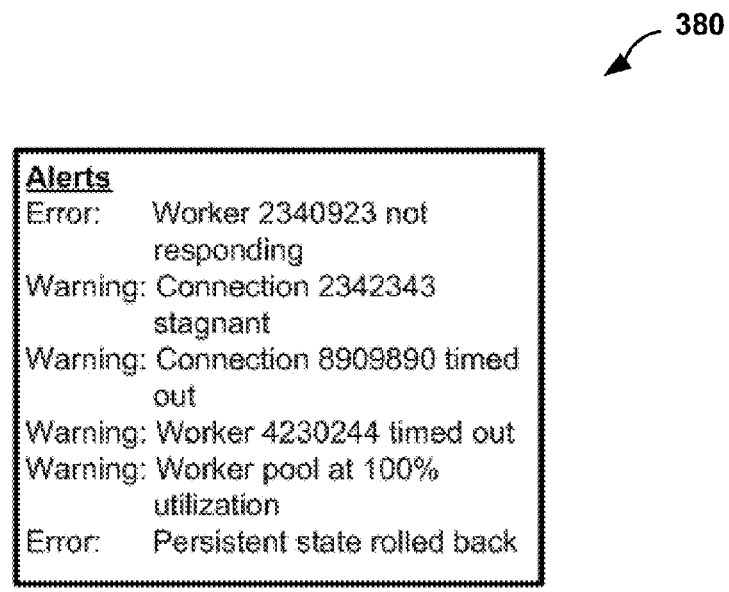
FIG. 10 is a conceptual diagram illustrating an example alerts interface, in accordance with one or more techniques of this disclosure.

FIG. 10 is a conceptual diagram illustrating an example alerts interface 380, in accordance with one or more techniques of this disclosure. Server computing system 12 may output an alerts interface (such as alerts interface 380) to alert a user (e.g., a system administrator) to various types of information, such as errors and warnings. For instance, in the example of FIG. 10, alerts interface 380 may alert a user to the fact that an error occurred because "Worker 2340923" is not responding.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
receiving, by a computing system, a plurality of messages from one or more client computing devices, each of the plurality of messages corresponding to a transaction in a plurality of transactions;
for each respective transaction in the plurality of transactions:
initializing, by the computing system and from a common template that has been determined to be free of malware infection, a respective one of a plurality of virtual machines that execute at one or more computing devices of the computing system, wherein initializing comprises initializing an instance of an application on the respective virtual machine in accordance with application state stored within a shared database;
wherein the plurality of messages includes a request to initiate a respective communication session between the computing system and a particular client computing device among the one or more client computing devices;
in response to receiving the request to initiate the respective communication session, assigning, by the computing system, the respective transaction to the respective virtual machine from the plurality of virtual machines, wherein the respective transaction is the first transaction assigned to the respective virtual machine;
generating, by the respective virtual machine, as part of the respective virtual machine completing the respective transaction, a database modification request associated with the respective transaction;
performing a modification to the shared database in response to the database modification request associated with the respective transaction, wherein the database modification request requests modification, within the shared database, of the application state for the application running on the respective virtual machine, and wherein the shared database is persisted independently of the plurality of virtual machines;
generating checkpoint data associated with the respective transaction;
in response to determining that processing of the respective transaction is complete upon detecting termination of the respective communication session, discarding, by the computing system, the respective virtual machine; and
in response to determining that the respective transaction is associated with a cyber-attack, using the checkpoint data associated with the respective transaction to roll back the modification to the shared database performed in response to the database modification request associated with the respective transaction.

2. The method of claim 1, wherein initializing the plurality of virtual machines comprises initializing each virtual machine in the plurality of virtual machines in response to receiving a message that corresponds to a new transaction.

3. The method of claim 1, wherein the respective communication session is a Transmission Control Protocol (TCP) session between the computing system and a particular client computing device among the one or more client computing devices.

4. The method of claim 3, wherein generating the checkpoint data associated with the respective transaction comprises generating a checkpoint in response to initiation or termination of the TCP session.

5. The method of claim 1, wherein each of the plurality of virtual machines is a type I hypervisor, a type II hypervisor, a paravirtualized virtual machine, a fully virtualized virtual machine, an application-level virtual machine, or an operating system-level virtual machine.

6. The method of claim 1, wherein the shared database is accessible to each of the plurality of virtual machines.

7. The method of claim 1, wherein the application is a server that provides a network service.

8. The method of claim 1, wherein generating the checkpoint data associated with the respective transaction comprises generating the checkpoint data associated with the respective transaction in response to the database modification request associated with the respective transaction.

9. The method of claim 1, wherein generating the checkpoint data associated with the respective transaction comprises generating the checkpoint data associated with the respective transaction in response to determining that a number of database modification requests associated with the respective transaction exceeds a threshold.

10. The method of claim 1, further comprising determining that the respective transaction is associated with a cyber-attack in response to determining that the respective transaction is associated with an unauthorized request to access or modify data in the shared database.

11. The method of claim 1, further comprising determining that the respective transaction is associated with a cyber-attack in response to determining that the respective transaction attempted to perform an unauthorized modification of programming code of the respective virtual machine or an unauthorized modification of a configuration of the respective virtual machine.

12. The method of claim 1, wherein each of transactions in the plurality of transactions corresponds to a single message in the plurality of messages.

13. A computing system comprising:
a shared database; and
one or more computing devices configured to:
receive a plurality of messages from one or more client computing devices, each of the plurality of messages corresponding to a transaction in a plurality of transactions;
for each respective transaction in the plurality of transactions:
initialize, from a common template that has been determined to be free of malware infection, a respective one of a plurality of virtual machines that execute at one or more of the computing devices of the computing system, wherein initializing comprises initializing an instance of an application on the respective virtual machine in accordance with application state stored within the shared database;
wherein the plurality of messages includes a request to initiate a respective communication session between the computing system and a particular client computing device among the one or more client computing devices;
in response to receiving the request to initiate the respective communication session, assign the respective transaction to the respective virtual machine from the plurality of virtual machines, wherein the respective transaction is the first transaction assigned to the respective virtual machine;
generate, as part of the respective virtual machine completing the respective transaction, a database modification request associated with the respective transaction;
perform a modification to the shared database in response to the database modification request associated with the respective transaction, wherein the database modification request requests modification, within the shared database, of the application state for the application running on the respective virtual machine, and wherein the shared database is persisted independently of the plurality of virtual machines;
generate checkpoint data associated with the respective transaction;
in response to determining that processing of the respective transaction is complete upon detecting termination of the respective communication session, discard the respective virtual machine; and
in response to determining that the respective transaction is associated with a cyber-attack, use the checkpoint data associated with the respective transaction to roll back the modification to the shared database performed in response to the database modification request associated with the respective transaction.

14. The computing system of claim 13, wherein the one or more processors are configured to initialize a virtual machine in the plurality of virtual machines in response to receiving a message that corresponds to a new transaction.

15. The computing system of claim 13, wherein the respective communication session is a Transmission Control Protocol (TCP) session between the computing system and a particular client computing device among the one or more client computing devices.

16. The computing system of claim 15, wherein the one or more processors are configured to generate the checkpoint data associated with the respective transaction such that the one or more processors:
generate a first checkpoint in response to initiation of the TCP session; and
generate a second checkpoint in response to termination of the TCP session.

17. The computing system of claim 13, wherein the shared database is accessible to each of the plurality of virtual machines.

18. The computing system of claim 13, wherein each of transactions in the plurality of transactions corresponds to a single message in the plurality of messages.

19. A non-transitory computer-readable data storage medium having stored thereon instructions that, when executed, configure a computing system to:
receive a plurality of messages from one or more client computing devices, each of the plurality of messages corresponding to a transaction in a plurality of transactions;
for each respective transaction in the plurality of transactions:
initialize, from a common template that has been determined to be free of malware infection, a respective one of a plurality of virtual machines that execute at one or more computing devices of the computing system, wherein initializing comprises initializing an instance of an application on the respective virtual machine in accordance with application state stored within a shared database;
wherein the plurality of messages includes a request to initiate a respective communication session between the computing system and a particular client computing device among the one or more client computing devices;
in response to receiving the request to initiate the respective communication session, assign the respective transaction to the respective virtual machine from the plurality of virtual machines, wherein the respective transaction is the first transaction assigned to the respective virtual machine;
generate, as part of the respective virtual machine completing the respective transaction, a database modification request associated with the respective transaction;
perform a modification to the shared database in response to the database modification request associated with the respective transaction, wherein the database modification request requests modification, within the shared database, of the application state for the application running on the respective virtual machine, and wherein the shared database is persisted independently of the plurality of virtual machines;
generate checkpoint data associated with the respective transaction;
in response to determining that processing of the respective transaction is complete upon detecting termination of the respective communication session, discard the respective virtual machine; and
in response to determining that the respective transaction is associated with a cyber-attack, use the checkpoint data associated with the respective transaction to roll back the modification to the shared database performed in response to the database modification request associated with the respective transaction.

20. A network node comprising:

a hardware-based processing system having a set of one or more processing units;

a plurality of virtual machines (VMs) executing on the one or more processing units, wherein each of the plurality of virtual machines is initialized from a common template that has been determined to be free of malware infection;

a dispatcher that:

receives, from one or more client computing devices, a plurality of messages corresponding to transactions in a plurality of transactions, wherein, for each respective transaction in the plurality of transactions, the plurality of messages includes requests to initiate respective communication sessions between the network node and particular client computing devices, assigns, in response to receiving the requests to initiate the respective communication sessions, each of the transactions to the plurality of virtual machines, and discards each of the VMs when the transactions assigned to the VMs are complete upon detecting termination of the respective communication sessions;

one or more intrusion detection systems that detect whether any of the VMs have been compromised and whether a shared database has been compromised;

a checkpointing module that generates checkpoint data based on requests from the VMs to modify the shared database, a rollback module that uses the checkpoint data to roll back modifications to the shared database that are associated with a particular transaction when the one or more intrusion detection systems determine that a VM to which the particular transaction was assigned has been compromised or the shared database has been compromised, and one or more processors are configured such that for each respective virtual machine from the plurality of virtual machines, the one or more processors generate a database modification request as part of completing a respective transaction from the plurality of transactions, the database modification request requesting storage to the shared database of an application state of an application running on the respective virtual machine, wherein the one or more processors initialize, from the common template, a particular virtual machine such that an instance of the application running on the particular virtual machine has the application state of the application running on one of the virtual machines.

\* \* \* \* \*